(12) United States Patent
Cheng et al.

(10) Patent No.: US 10,608,527 B2
(45) Date of Patent: Mar. 31, 2020

(54) POWER SUPPLY APPARATUS

(71) Applicant: I-SHOU UNIVERSITY, Kaohsiung (TW)

(72) Inventors: Chun-An Cheng, Kaohsiung (TW); Er-Yun Chang, Kaohsiung (TW); Chin-Chih Lai, Kaohsiung (TW); Man-Tang Chang, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 0 days.

(21) Appl. No.: 15/995,151

(22) Filed: Jun. 1, 2018

(65) Prior Publication Data
US 2019/0372455 A1    Dec. 5, 2019

(51) Int. Cl.
*H02M 1/42*    (2007.01)
*H05B 33/08*   (2020.01)
*H02M 1/34*    (2007.01)
*H02M 1/14*    (2006.01)
*H02M 3/335*   (2006.01)

(52) U.S. Cl.
CPC .......... *H02M 1/4258* (2013.01); *H02M 1/14* (2013.01); *H02M 1/34* (2013.01); *H02M 3/33546* (2013.01); *H05B 33/0815* (2013.01); *H02M 2001/342* (2013.01)

(58) Field of Classification Search
CPC .......... H05B 33/0815; H05B 33/0827; H05B 33/0824; H05B 33/0845; H05B 33/0848; H05B 33/0851; H05B 33/0887; H05B 33/08; H05B 33/0809; H05B 33/0812; H05B 33/0818; H05B 33/0821; H05B 33/083; H05B 33/0842; H05B 33/086; H05B 33/0884; H05B 33/089; H05B 37/029
USPC .............. 315/307, 185 R, 186, 224, 308
See application file for complete search history.

(56) References Cited

U.S. PATENT DOCUMENTS 9,356,522 B2    5/2016  Hong et al.
9,445,468 B1 *  9/2016  Cheng ................ H02M 1/4258
(Continued)

FOREIGN PATENT DOCUMENTS

CN    104955200    9/2015
TW    200623597    7/2006
(Continued)

OTHER PUBLICATIONS

"Office Action of Taiwan Counterpart Application", dated Dec. 20, 2018, p. 1-p. 5.

*Primary Examiner* — Wei (Victor) Y Chan
(74) *Attorney, Agent, or Firm* — JCIPRNET

(57) ABSTRACT

A power supply apparatus for driving a light emitting apparatus is provided. The power supply apparatus includes a lossless snubber circuit and a power converting circuit. The lossless snubber circuit has a first diode, a first inductor and a second diode coupled in series between an input end and a first reference end, and has a first capacitor coupled between the first diode and a second reference end. The power converting circuit has a switch, a transformer and a second indictor. The switch is coupled between the first and second reference ends, and is turned on or off according to a control signal. The second inductor is coupled to a first side of the transformer in parallel.

12 Claims, 9 Drawing Sheets

(56) References Cited

U.S. PATENT DOCUMENTS

| | | | | |
|---|---|---|---|---|
| 2002/0097588 A1* | 7/2002 | Priegnitz | ............... | H02M 1/34 |
| | | | | 363/21.04 |
| 2004/0252529 A1* | 12/2004 | Huber | ............... | H02M 1/4258 |
| | | | | 363/21.12 |
| 2007/0263417 A1* | 11/2007 | Lin | ............... | H02M 1/34 |
| | | | | 363/21.12 |
| 2011/0025217 A1* | 2/2011 | Zhan | ............... | H02M 3/335 |
| | | | | 315/219 |
| 2011/0317450 A1* | 12/2011 | Cheng | ............... | H02M 1/4241 |
| | | | | 363/20 |
| 2014/0362613 A1* | 12/2014 | Park | ............... | H02M 1/34 |
| | | | | 363/21.16 |
| 2015/0162840 A1 | 6/2015 | Frost et al. | | |
| 2017/0048937 A1* | 2/2017 | Wang | ............... | H01F 38/14 |

FOREIGN PATENT DOCUMENTS

| | | |
|---|---|---|
| TW | 201225475 | 6/2012 |
| TW | M449408 | 3/2013 |
| TW | I407677 | 9/2013 |
| TW | I523572 | 2/2016 |
| TW | 201628329 | 8/2016 |

* cited by examiner

POWER SUPPLY APPARATUS

BACKGROUND OF THE INVENTION

Field of the Invention

The invention relates to a power supply apparatus, and particularly relates to a power supply apparatus for driving a light emitting apparatus.

Description of Related Art

As the technologies of light emitting diodes (LEDs) advance, it has become a trend to apply high-power LEDs to a light emitting apparatus featuring high luminance, such as road lamps. Based on the statistics, the road lamps (including street lights) across the world consumed power totaling 114 TWh in 2005. Based on this number, it is estimated that there were about 130 million road lamps across the world. Besides, the number of road lamps has been increasing annually. Taking the year of 2010 as an example, the global market scale of road lamps reached about 160 to 180 million road lamps, and has been growing at an annual growth rate of 20%.

On the other hand, the issue of global warming is receiving more and more attention, and energy conservation and carbon emission reduction have become major concerns for electronic apparatuses. Therefore, providing an efficient power supply apparatus for driving the road lamps has become an issue for the designers of this field.

SUMMARY OF THE INVENTION

The invention provides a power supply apparatus capable of correcting the power factor.

A power supply apparatus of the invention is configured to drive a light emitting apparatus. The power supply apparatus includes a lossless snubber circuit and a power converting circuit. The lossless snubber circuit has a first diode, a first inductor and a second diode coupled in series between an input end and a first reference end, and has a first capacitor coupled between the first diode and a second reference end. In addition, the input end receives input power. The power converting circuit has a switch, a transformer and a second indictor. The switch is coupled between the first and second reference ends, and is turned on or off according to a control signal. A first side of the transformer is coupled between the input end and the second reference end, and a secondary side of the transformer is coupled between an output end and a third reference end. The second inductor is coupled to the first side of the transformer in parallel.

According to an embodiment of the invention, the power supply apparatus further includes a third diode. The third diode is coupled between the secondary side of the transformer and the output end.

According to an embodiment of the invention, the switch is turned on in a first time interval, the input end provides the input power to increase a current at the second inductor linearly, the first capacitor transmits electrical power to the first inductor, the second diode is turned on, and the first diode and the third diode are cut off.

According to an embodiment of the invention, the switch is turned off in a second time interval after the first time interval, such that the first diode, the second diode, and the third diode are turned on, the second inductor provides electrical power to the output end through the transformer, and the current at the second inductor drops linearly.

According to an embodiment of the invention, in the second time interval, electrical power at the first inductor is transmitted to the input end.

According to an embodiment of the invention, in a third time interval after the second time interval, the first diode and the second diode are cut off, and the second inductor transmits electrical power to the output end through the transformer.

According to an embodiment of the invention, an anode of the first diode is coupled to the input end, a cathode of the first diode is coupled to a first end of the first inductor, a second end of the first inductor is coupled to an anode of the second diode, a cathode of the second diode is coupled to the first reference end, and the first capacitor is coupled between the cathode of the first diode and the second reference end.

According to an embodiment of the invention, the power supply apparatus further includes a third inductor. The third inductor is coupled between the second inductor and an anode of the first diode.

According to an embodiment of the invention, the power supply apparatus further includes an input capacitor and an output capacitor. The input capacitor is coupled between the input end and the first reference end. The output capacitor is coupled between the output end and the third reference end.

According to an embodiment of the invention, the power supply apparatus further includes a control signal generator. The control signal generator is coupled to the switch, the output end, the input end, and the transformer. The control signal generator respectively obtains a plurality of feedback signals by detecting voltage signals and/or current signals at the output end, the input end, and the transformer, and generates the control signal according to the feedback signals.

According to an embodiment of the invention, the control signal generator includes an alternating current (AC) voltage detecting circuit, an output voltage and current feedback circuit, and a pulse width modulation signal generator. The AC voltage detecting circuit is coupled to the input end and generates a first feedback signal according to a voltage at the input end. The inductor current detecting circuit is coupled to the transformer and generates a second feedback signal according to a voltage at the transformer. The output voltage and current feedback circuit is coupled to the output end and generates a third feedback signal according to a voltage and a current at the output end. The pulse width modulation signal generator is coupled to the AC input voltage detecting circuit, the inductor current detecting circuit, and the output voltage and current feedback circuit, and generates the control signal according to the first feedback signal, the second feedback signal, and the third feedback signal.

According to an embodiment of the invention, the control signal generator further includes an optical coupler. The optical coupler is coupled between the output voltage and current feedback circuit and the pulse width modulation signal generator. The optical coupler transmits the third feedback signal to the pulse width modulation signal generator through optical coupling.

According to an embodiment of the invention, the power supply apparatus further includes a filter and a bridge rectifier. The filter receives and filters alternating current (AC) power. The bridge rectifier is coupled to the filter, rectifies the AC power, and generates the input power.

Based on the above, in the power supply apparatus proposed in the invention, the magnetizing inductor (the second inductor) is designed to be operated under the discontinuous-conduction mode (DCM) and capable of correcting the power factor. Moreover, in the power supply apparatus of the invention, the current at the magnetizing inductor (the second inductor) is designed to be operated under the boundary conduction mode and is capable of achieving the effect of a high power factor by controlling the times at which the switch is turned on and off.

In order to make the aforementioned and other features and advantages of the invention comprehensible, several exemplary embodiments accompanied with figures are described in detail below.

DESCRIPTION OF THE EMBODIMENTS

Figure 1:
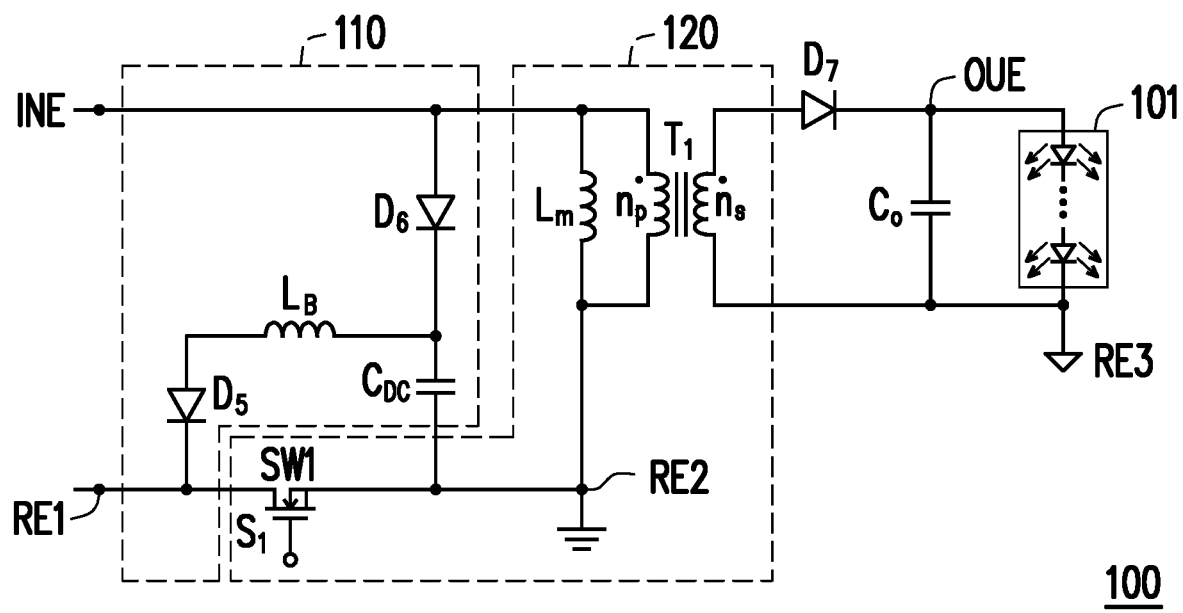
FIG. 1 is a schematic diagram illustrating a power supply apparatus according to an embodiment of the invention.

Referring to FIG. 1, FIG. 1 is a schematic diagram illustrating a power supply apparatus according to an embodiment of the invention. A power supply apparatus 100 includes a lossless snubber circuit 110 and a power converting circuit 120. The lossless snubber circuit 110 includes diodes $D_5$ and $D_6$, an inductor $L_B$, and a capacitor $C^{DC}$. The diodes $D_6$, the inductor $L_B$, and the diode $D_5$ are connected in series in order between an input end INE and a reference end RE1. Specifically, the anode of the diode $D_6$ is coupled to the input end INE, and the cathode of the diode $D_6$ is coupled to the first end of the inductor $L_B$. The second end of the inductor $L_B$ is coupled to the anode of the diode $D_5$, and the cathode of the diode $D_5$ is coupled to the reference end RE1. The capacitor $C_{DC}$ is coupled between the cathode of the diode $D_6$ and a reference end RE2.

Besides, in the embodiment, the power converting circuit 120 includes a switch SW1, an inductor $L_m$, and a transformer $T_1$. The switch SW1 may be formed by a power transistor, and is coupled between the reference end RE1 and the reference end RE2. The switch SW1 is turned on or off under the control of the control signal S1. The transformer $T_1$ has a first side $n_p$ and a secondary side $n_n$. In addition, the first side $n_p$ of the transformer $T_1$ is coupled between the input end INE and the reference end RE2, and the secondary side $n_n$ of the transformer $T_1$ is coupled between an output end OUE and a reference end RE3. The inductor $L_m$ is coupled in parallel to the first side $n_p$ of the transformer $T_1$.

Besides, the power converting circuit 120 includes a diode $D_7$ and an output capacitor $C_o$, the anode of the diode $D_7$ is coupled to the secondary side $n_n$ of the transformer $T_1$, and the cathode of the diode $D_7$ is coupled to the output end OUE. The output capacitor $C_o$ is serially coupled between the output end OUE and the reference end RE3. In addition, the reference end RE2 may serve as a reference ground end of the first side $n_p$ of $T_1$, and the reference end RE3 may serve as a reference ground end of the secondary side $n_n$ of $T_1$.

Figure 2A:
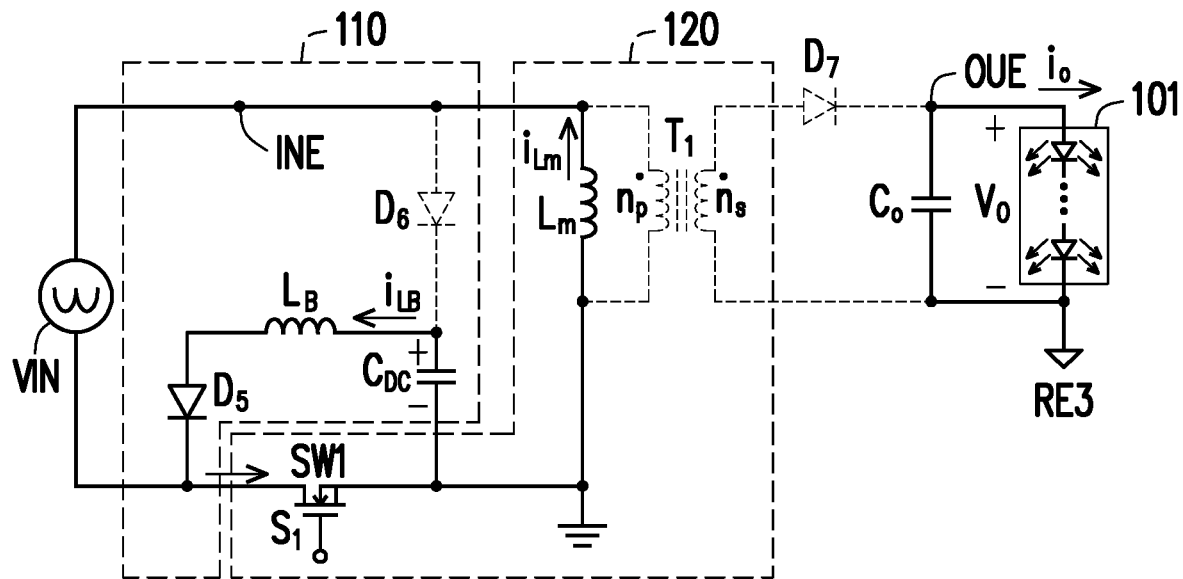
FIGS. 2A to 2D are equivalent circuit diagrams of operation states of a power supply apparatus.

Regarding the operation details of the power supply apparatus 100, FIGS. 2A to 2D are equivalent circuit diagrams of operation states of the power supply apparatus. In FIG. 2A, the power supply apparatus 100 is operated in a first time period. During the first time period, the switch SW1 is turned on according to the control signal $S_1$, the diode $D_5$ is turned on, and the diodes $D_6$ and $D_7$ are cut off. Meanwhile, the capacitor $C_{DC}$, the inductor $L_B$, the diode $D_5$, and the switch SW1 form a loop. The electrical power in the capacitor $C_{DC}$ is transmitted to the inductor $L_B$ to increase a current $i_{LB}$ at the inductor $L_B$ linearly. Besides, the inductor $L_m$, an input power VIN, and the switch SW1 also form another loop. In addition, according to the electrical power provided by the input power VIN, a current $i_{Lm}$ at the inductor $L_m$ is increased linearly correspondingly.

Also, the output capacitor $C_o$ provides the stored electrical power to generate an output current $I_O$, and a light emitting apparatus 101 is driven by the output current $I_O$ to emit light. The light-emitting device 101 may be a road lamp constructed by light emitting diodes.

Figure 2B:
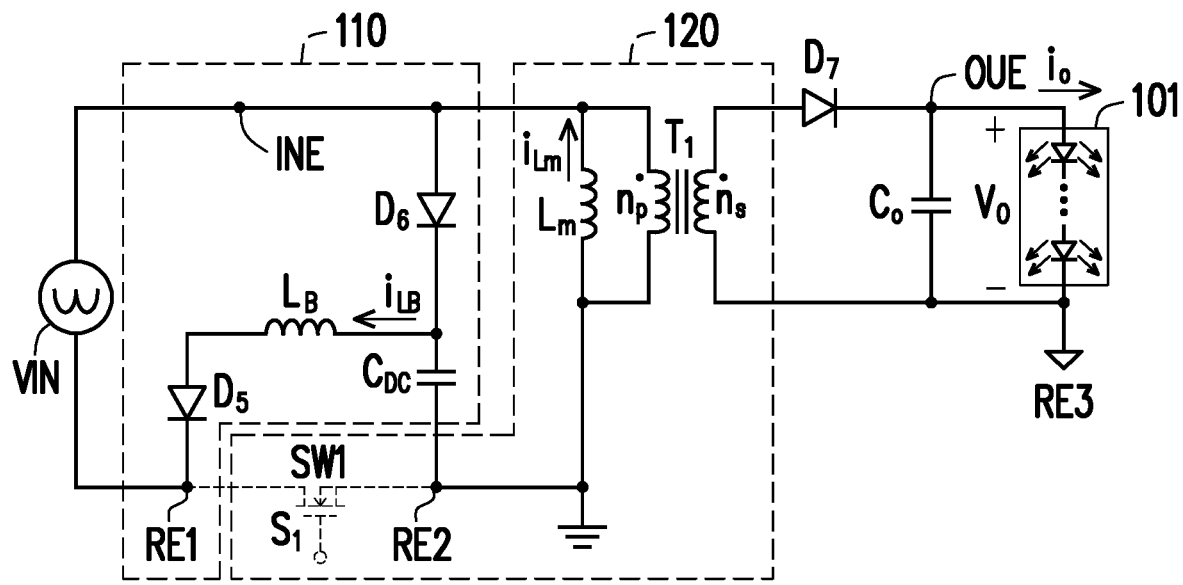

Then, referring to FIG. 2B, the power supply apparatus 100 is operated at a first stage of a second time period in FIG. 2B. At this time, the switch SW1 is turned off according to the control signal $S_1$, and the diodes $D_5$, $D_6$, and $D_7$ are all turned on. The input power VIN, the diode $D_6$, the inductor $L_B$, and the diode $D_5$ form a loop. At this time, the current $i^{LB}$ of the inductor $L_B$ as a snubber inductor drops linearly and transmits electrical power back to the input end INE. Besides, the inductor $L_m$, the diode $D_6$, and the capacitor $C_{DC}$ form a second loop. The current $i_{Lm}$ of the inductor $L_m$ as a magnetizing inductor drops linearly, and the inductor $L_m$ transmits electrical power to the output end OUE through the transformer $T_1$, so as to drive the light emitting apparatus 101.

Figure 2C:
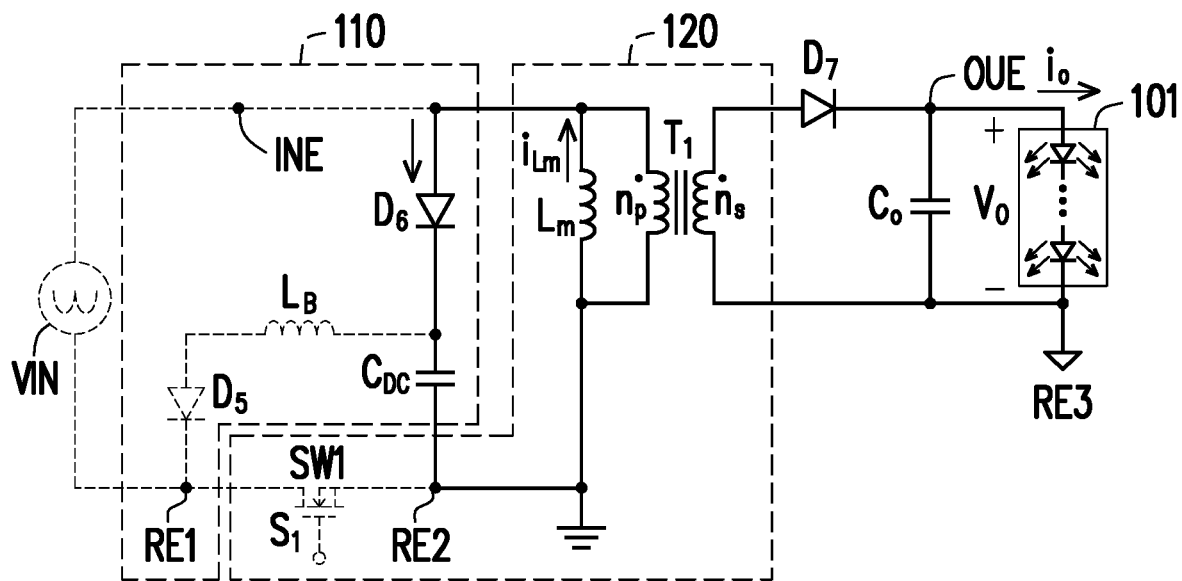

Referring to FIG. 2C, the power supply apparatus 100 is operated at a second stage of the second time period in FIG. 2C. At this time, the switch SW1 is constantly turned off according to the control signal S1. The diode $D_5$ is cut off, and the diodes $D_6$ and $D_7$ are turned on. At this time, the electrical power in the inductor $L_B$ is completely released, while the loop formed by the inductor $L_m$, the diode $D_6$, and the capacitor $C_{DC}$ continues operating. The current $i_{Lm}$ of the inductor $L_m$ drops linearly, and the inductor $L_m$ transmits electrical power to the output end OUE through the transformer $T_1$, and drives the light emitting apparatus 101 with the output current $I_O$.

Figure 2D:
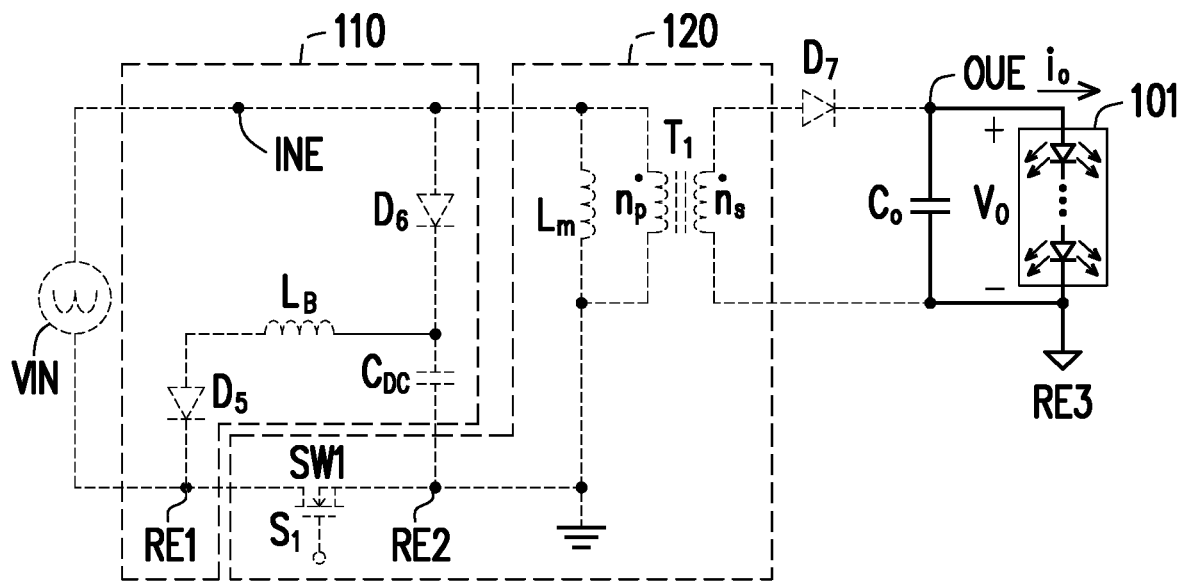

Referring to FIG. 2D, the power supply apparatus 100 is operated at a third stage of the second time period in FIG. 2D. At this time, the switch SW1 is constantly turned off according to the control signal $S_1$. Also, since the electrical power of the inductor $L_m$ is completely released, the diodes $D_6$ and $D_7$ are cut off correspondingly. At this time, the output capacitor $C_o$ provides electrical power to generate the output current $I_O$ and thereby drive the light emitting apparatus 101. Besides, after this stage, the switch SW1 is turned on again to enter the next power supply period (i.e., the first time period).

With the periodic operation according to the first time period and the three stages of the second time period, the power supply apparatus 100 is able to continuously provide electrical power to drive the light emitting apparatus 101. Through functioning of the lossless snubber circuit 110, the rising of the voltage at the switch SW1 that occurs during switching of the switch SW1 is alleviated, and snubbering is thus achieved. In addition, when the switch SW1 is turned off, the electrical power at the capacitor $C_{DC}$ may be recollected to the input end INE to reduce power consumption.

Figure 3:
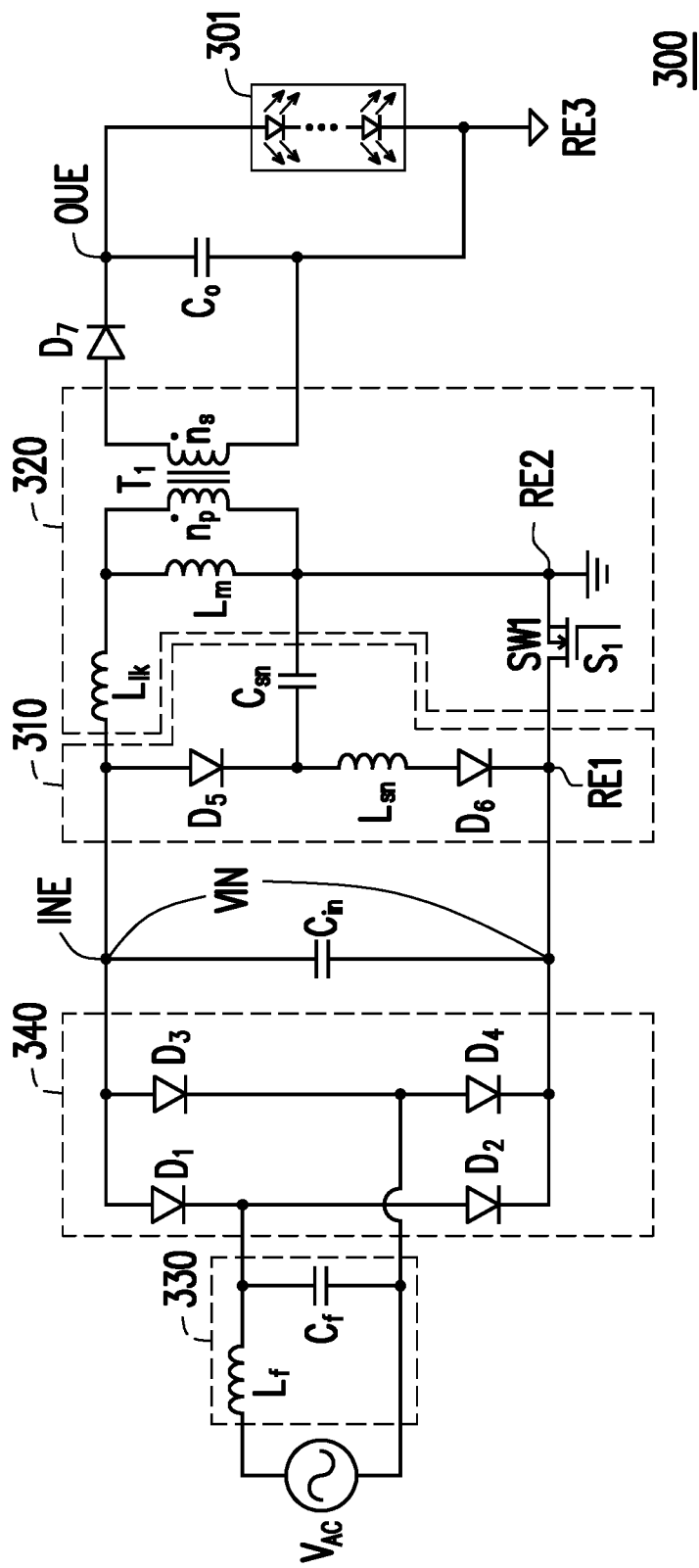
FIG. 3 is a schematic diagram illustrating a power supply apparatus according to another embodiment of the invention.

Referring to FIG. 3, FIG. 3 is a schematic diagram illustrating a power supply apparatus according to another embodiment of the invention. A power supply apparatus 300 serves to drive a light emitting apparatus 301. The power supply apparatus 300 includes a lossless snubber circuit 310, a power converting circuit 320, a filter 330, a bridge rectifier 350, an input capacitor $C_{in}$, the output capacitor $C_o$, and a diode D7. The filter 330 is coupled to an alternating current (AC) power $V_{AC}$, and performs filtering on the AC power $V_{AC}$. The bridge rectifier 350 is coupled to the filter 340 to rectify the AC power $V_{AC}$ and generate an input power VIN. The filter 330 is a low-pass filter formed by an inductor $L_f$ and a capacitor $C_f$. The bridge rectifier 350 is formed by diodes $D_1$ to $D_4$. The input capacitor $C_{in}$ is disposed between the input end INE and the reference end RE1, and receives the input power VIN. The lossless snubber 310 is coupled to the input end INE, and includes the diode $D_5$, an inductor $L_{sn}$, and the diode $D_6$ connected in series in order between the input end INE and the reference end RE1, and includes a capacitor $C_{sn}$ coupled between the cathode end of the diode $D_5$ and the transformer $T_1$.

The power converting circuit 320 is coupled to the lossless snubber circuit 310, and includes the switch SW1, an inductor $L_{lk}$, the inductor $L_m$, and the transformer $T_1$. What differs from the previous embodiment is that the power converting circuit 320 of the embodiment includes the inductor $L_{lk}$. The inductor $L_{lk}$ is coupled between the input end INE and the transformer $T_1$, and may serve as a leakage inductor.

Figure 4A:
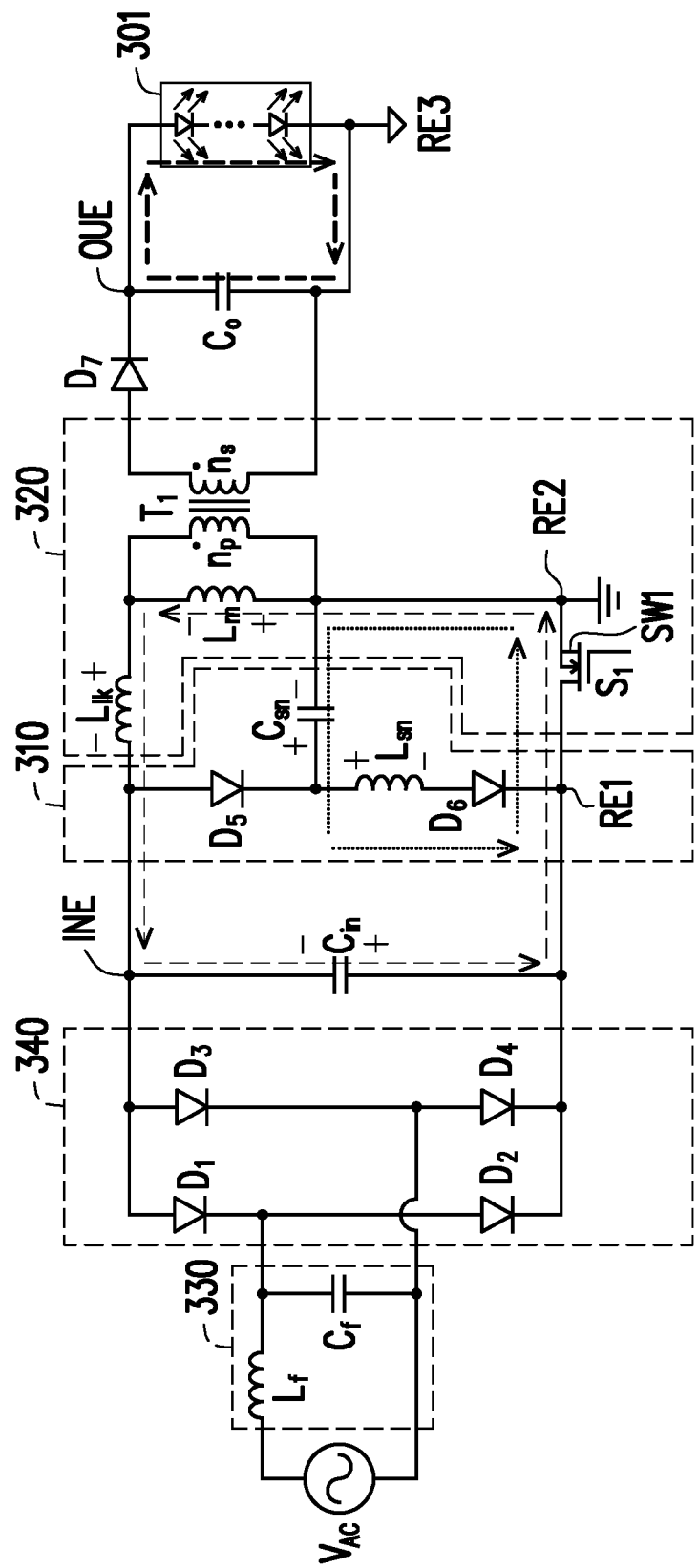
FIGS. 4A to 4D are equivalent circuit diagrams of operation states of a power supply apparatus.

Regarding the operation details of the power supply apparatus 300, FIGS. 4A to 4D are equivalent circuit diagrams of operation states of the power supply apparatus. In FIG. 4A, the power supply apparatus 300 is operated in the first time period. During the first time period, the switch SW1 is turned on according to the control signal $S_1$, the diodes $D_5$ and $D_6$ are turned on, and the diode $D_7$ is cut off. Meanwhile, the capacitor $C_{sn}$, the inductor $L_{sn}$, the diode $D_6$, and the switch SW1 form a loop. The electrical power in the capacitor $C_{sn}$ is transmitted to the inductor $L_{sn}$ to increase the current at the inductor $L_B$ linearly. Besides, the inductor $L_m$, the inductor $L_{lk}$, the input capacitor $C_{in}$, and the switch SW1 form another loop. In addition, according to the electrical power provided by the input power VIN, currents at the inductor $L_m$ and the inductor $L_{lk}$ are correspondingly increased linearly.

Also, the output capacitor $C_o$ provides the stored electrical power to generate the output current, and the light emitting apparatus 301 is driven by the output current to emit light. The light-emitting device 301 may be a road lamp constructed by light emitting diodes.

Figure 4B:
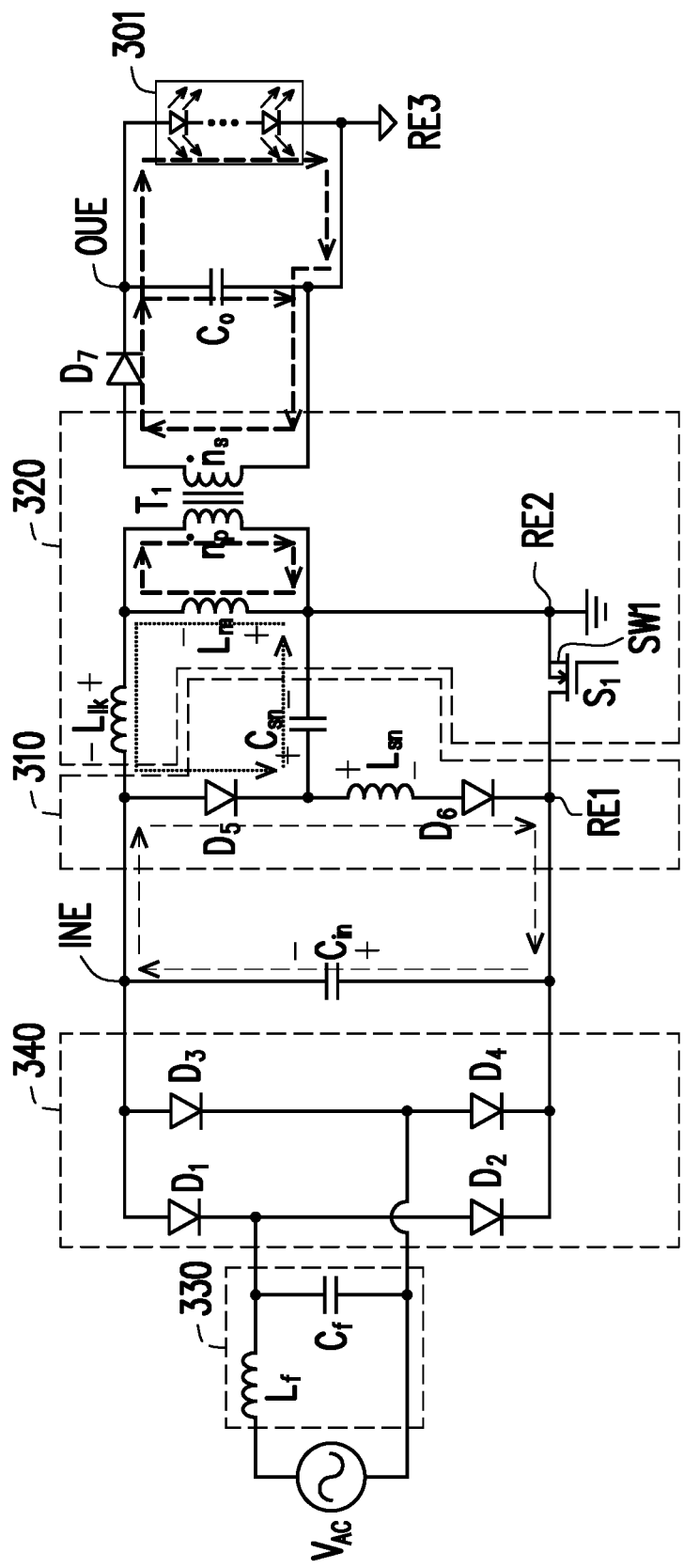

Then, referring to FIG. 4B, the power supply apparatus 400 is operated at a first stage of a second time period in FIG. 4B. At this time, the switch SW1 is turned off according to the control signal $S_1$, and the diodes $D_5$, $D_6$, and $D_7$ are all turned on. The input capacitor $C_{in}$, the diode $D_5$, the inductor $L_{sn}$, and the diode $D_6$ form a loop. At this time, the current of the inductor $L_{sn}$ as a snubber inductor drops linearly and transmits electrical power back to the input capacitor $C_{in}$. Besides, the inductor $L_{lk}$, the diode $D_5$, and the capacitor $C_{sn}$ form the second loop. Also, the current of the inductor $L_{lk}$ as the leakage inductor drops linearly, and the inductor $L_{lk}$ transmits electrical power to the output end OUE through the transformer $T_1$, so as to drive the light emitting apparatus 301. Moreover, the inductor $L_m$ and the first side $n_p$ of the transformer $T_1$ form a third loop. The current of the inductor $L_m$ as the magnetizing inductor drops linearly, and the inductor $L_m$ transmits electrical power to the output end OUE through the transformer $T_1$, so as to drive the light emitting apparatus 301.

Figure 4C:
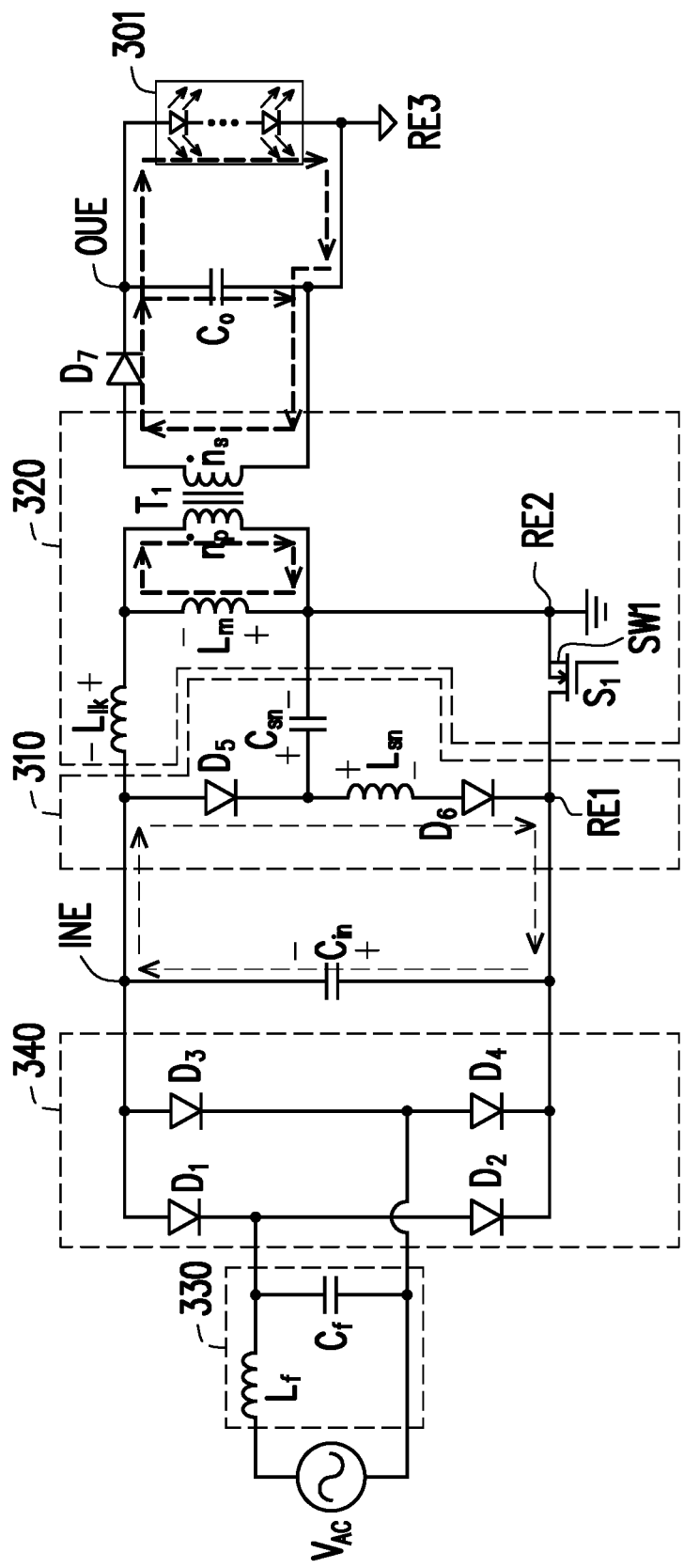

Then, referring to FIG. 4C, the power supply apparatus 300 is operated at the second stage of the second time period in FIG. 4C. At this time, the switch SW1 is constantly turned off according to the control signal S1. The diodes $D_5$ to $D_7$ are all turned on. At this time, the electrical power in the inductor $L_{lk}$ is completely released, and the loop formed by the inductor $L_m$ and the first side $n_p$ of the transformer $T_1$ continues operating. The current of the inductor $L_m$ as the magnetizing inductor drops linearly, and the inductor $L_m$ transmits electrical power to the output end OUE through the transformer $T_1$, so as to drive the light emitting apparatus 301. Meanwhile, the loop formed by the input capacitor $C_{in}$, the diode $D_5$, the inductor $L_{sn}$, and the diode $D_6$ continues operating, and the inductor $L_{sn}$ continues transmitting electrical power back to the input capacitor $C_{in}$.

Figure 4D:
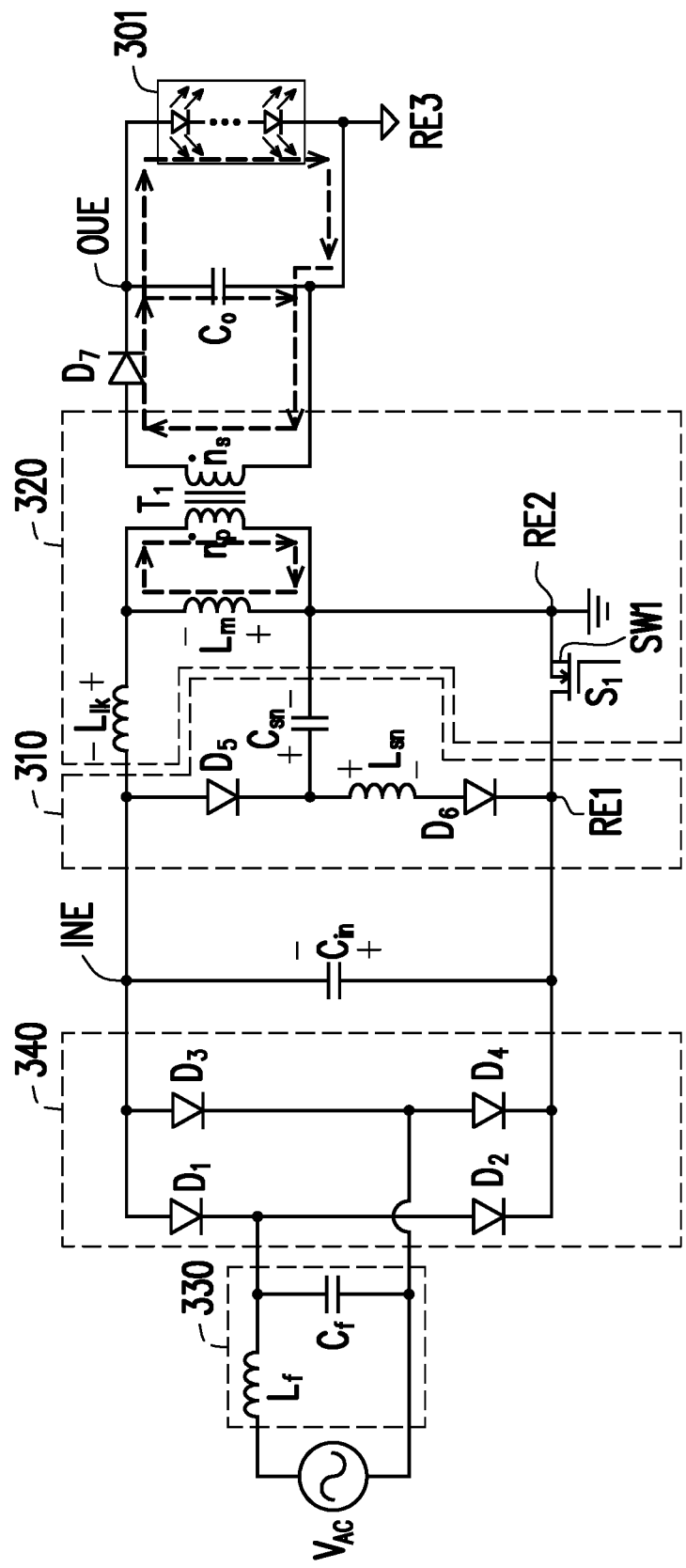

Referring to FIG. 4D, the power supply apparatus 300 is operated at the third stage of the second time period in FIG. 4D. At this time, the switch SW1 is constantly turned off according to the control signal $S_1$. Also, since the electrical power of the inductor $L_{sn}$ is completely released, the diode $D_5$ is cut off correspondingly. At this time, the loop formed by the inductor $L_m$ and the first side $n_p$ of the transformer $T_1$ continues operating, and the inductor $L_m$ provides electrical power through the transformer T1 to drive the light emitting apparatus 301. Besides, after this stage, the switch SW1 is turned on again to enter the next power supply period (i.e., the first time period).

With the periodic operation according to the first time period and the three stages of the second time period, the power supply apparatus 300 is able to continuously provide electrical power to drive the light emitting apparatus 301. Through functioning of the lossless snubber circuit 310, the rising of the voltage at the switch SW1 that occurs during switching of the switch SW1 is alleviated, and snubbering is thus achieved. In addition, when the switch SW1 is turned off, the electrical power at the capacitor $C_{sn}$ may be recollected to the input end INE to reduce power consumption.

Figure 5:
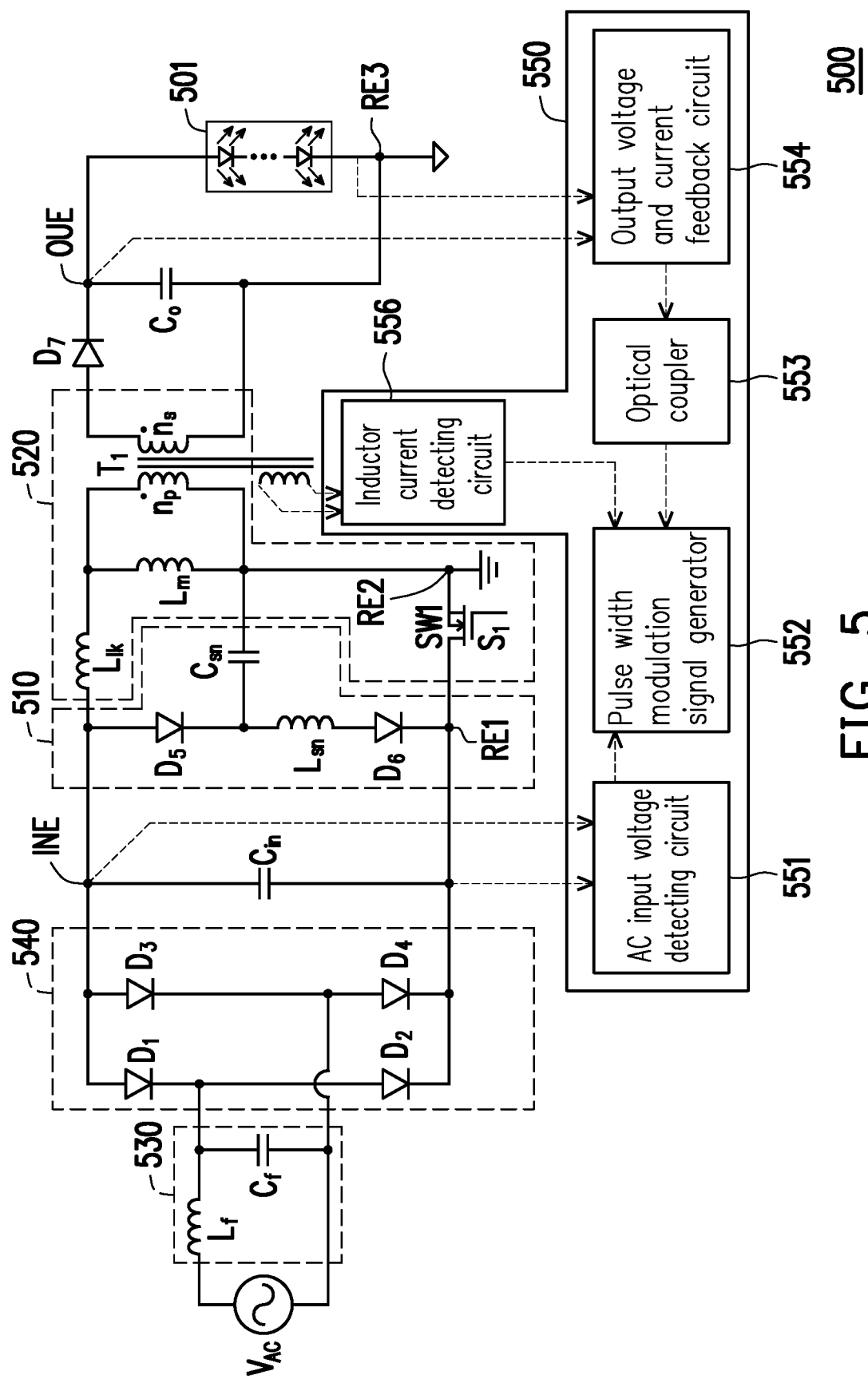
FIG. 5 is a schematic diagram illustrating a power supply apparatus according to yet another embodiment of the invention.

Referring to FIG. 5, FIG. 5 is a schematic diagram illustrating a power supply apparatus according to yet another embodiment of the invention. A power supply apparatus 500 includes a filter 530, a bridge rectifier 540, a lossless snubber circuit 510, a power converting circuit 520, the input capacitor $C_{in}$, the output capacitor $C_o$, and a diode $D_7$. The power supply apparatus 500 receives the alternating power $V^{AC}$ for driving a light emitting apparatus 501. Regarding the circuit operation of the power supply apparatus 500, details are already explicated in the foregoing embodiments and thus will not be repeated in the following.

What differs from the foregoing embodiments is that the power supply apparatus 500 further includes a control signal generator 550. The control signal generator 550 is coupled to the switch SW1, the output end OUE, the input end INE, and the transformer $T_1$. The control signal generator 550 respectively obtains a plurality of feedback signals by detecting voltage signals and/or current signals at the output end OUE, the input end INE, and the transformer $T_1$. The control signal generator 550 further generates the control signal $S_1$ according to the feedback signals.

In the embodiment, the control signal generator 550 includes an AC input voltage detecting circuit 551, an inductor current detecting circuit 556, an output voltage and current feedback circuit 554, a pulse width modulation signal generator 552, and an optical coupler 553. The AC input voltage detecting current 551 is coupled to the input end INE to generate a first feedback signal according to the voltage at the input end INE. The inductor current detecting circuit 556 is coupled to the transformer T1 to generate a second feedback signal according to the voltage at the transformer $T_1$. The output voltage and current feedback circuit 554 is coupled to the output end OUE to generate a third feedback signal according to the voltage and the current at the output end OUE. The pulse width modulation signal generator 552 is coupled to the AC input voltage detecting circuit 551, the inductor current detecting circuit 556, and the output voltage and current feedback circuit 554 to generate the control signal $S_1$ according to the first feedback signal, the second feedback signal, and the third feedback signal.

Besides, since the first side and the secondary side of the transformer $T_1$ have respectively different reference ends RE2 and RE3, the optical coupler 553 may be disposed between the pulse width modulation signal generator 552 and the output voltage and current feedback circuit 554 in the control signal generator 550. Through optical coupling, the optical coupler 553 transmits the third feedback signal to the pulse width modulation signal generator 552.

Besides, to detect the current at the light emitting apparatus 501, a resistor $R_O$ may be serially connected between the light emitting apparatus 501 and the reference end RE3. By measuring the voltage difference between the resistor $R_o$ and the reference end RE3, the magnitude of the current at the light emitting apparatus 501 is known.

In the embodiment of the invention, the current at the inductor $L_m$ is designed to be operated under the boundary conduction mode, and the signals fed back from the AC input voltage detecting circuit 551 and the inductor current detecting circuit 556 are transmitted to the pulse width modulation signal generator 552 with the function of a multiplier. Therefore, the current signal at the input end INE is able to trace the voltage of the AC input power $V_{AC}$ and thereby achieve the effect of a high power factor. Besides, the output voltage and current feedback circuit 550 is capable of detecting the voltage and current signals of the light emitting apparatus 501 and transmitting the feedback signals to the pulse width modulation signal generator 552 with the multiplier function through the optical coupler 553, so as to change the switching frequency of the switch SW1. In this way, the output voltage and the output current of the light emitting apparatus 501 is under control.

In view of the foregoing, with the lossless snubber circuit and the power converting circuit working together in the invention, the input power can be effectively recollected to reduce power consumption. Besides, by designing the magnetizing inductor (the second inductor) of the transformer to be operated under a discontinuous-conduction mode, the power factor can be corrected. Moreover, by controlling the times at which the switch is turned on and off, the effect of a high power factor is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A power supply apparatus, configured to drive a light emitting apparatus and comprising:
  a lossless snubber circuit, having a first diode, a first inductor, and a second diode coupled in series between an input end and a first reference end, and having a first capacitor directly connected between the first diode and a second reference end by a positive-polarity end of the first capacitor, wherein the input end receives an input power, the second reference end is a ground end, and a negative-polarity end of the first capacitor is directly connected to the second reference end; and
  a power converting circuit, comprising:
    a switch, directly connected between the first reference end and the second reference end and turned on or off according to a control signal;
    a transformer, wherein a negative-polarity terminal of a first side of the transformer is coupled to the input end and a positive-polarity terminal of the first side of the transformer is directly connected to the second reference end, and a secondary side of the transformer is coupled between an output end and a third reference end; and
    a second inductor, coupled in parallel to the first side of the transformer,
  wherein the input end is directly coupled to a negative-polarity of an input power and the first reference end is directly coupled to a positive-end of the input power.

2. The power supply apparatus as claimed in claim 1, further comprising:
  a third diode, coupled between the secondary side of the transformer and the output end.

3. The power supply apparatus as claimed in claim 2, wherein the switch is turned on in a first time interval, the input end provides the input power to increase a current at the second inductor linearly, the first capacitor transmits electrical power to the first inductor, the second diode is turned on, and the first diode and the third diode are cut off.

4. The power supply apparatus as claimed in claim 3, wherein the switch is turned off in a second time interval after the first time interval, such that the first diode, the second diode, and the third diode are turned on, the second inductor provides electrical power to the output end through the transformer, and the current at the second inductor drops linearly.

5. The power supply apparatus as claimed in claim 4, wherein in the second time interval, electrical power at the first inductor is transmitted to the input end.

6. The power supply apparatus as claimed in claim 4, wherein in a third time interval after the second time interval, the first diode and the second diode are cut off, and the second inductor transmits electrical power to the output end through the transformer.

7. The power supply apparatus as claimed in claim 1, further comprising:
  a third inductor, coupled between the second inductor and an anode of the first diode.

8. The power supply apparatus as claimed in claim 1, further comprising:
  an input capacitor, coupled between the input end and the first reference end; and
  an output capacitor, coupled between the output end and the third reference end.

9. The power supply apparatus as claimed in claim 1, further comprising:
  a control signal generator, coupled to the switch, the output end, the input end, and the transformer, respectively obtaining a plurality of feedback signals by detecting voltage signals and/or current signals at the output end, the input end, and the transformer, and generating the control signal according to the feedback signals.

10. The power supply apparatus as claimed in claim 9, wherein the control signal generator comprises:
   an alternating current (AC) voltage detecting circuit, coupled to the input end and generating a first feedback signal according to a voltage at the input end;
   an inductor current detecting circuit, coupled to the transformer and generating a second feedback signal according to a voltage at the transformer;
   an output voltage and current feedback circuit, coupled to the output end and generating a third feedback signal according to a voltage and a current at the output end; and
   a pulse width modulation signal generator, coupled to the AC input voltage detecting circuit, the inductor current detecting circuit, and the output voltage and current feedback circuit, and generating the control signal according to the first feedback signal, the second feedback signal, and the third feedback signal.

11. The power supply apparatus as claimed in claim 10, wherein the control signal generator further comprises:
   an optical coupler, coupled between the output voltage and current feedback circuit and the pulse width modulation signal generator, and transmitting the third feedback signal to the pulse width modulation signal generator through optical coupling.

12. The power supply apparatus as claimed in claim 1, further comprising:
   a filter, receiving and filtering alternating current (AC) power; and
   a bridge rectifier, coupled to the filter, rectifying the AC power and generating the input power.

* * * * *